US012581570B2

(12) United States Patent
Stamatakis

(10) Patent No.: US 12,581,570 B2
(45) Date of Patent: **\*Mar. 17, 2026**

(54) SYSTEM, METHOD AND APPARATUS FOR ENABLING ENVIRONMENTAL TRACKING AT A MONITORED LOCATION

(71) Applicant: Senseware, Inc., Vienna, VA (US)

(72) Inventor: Julien G. Stamatakis, Centreville, VA (US)

(73) Assignee: Senseware, Inc., Vienna, VA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/587,189

(22) Filed: Feb. 26, 2024

(65) Prior Publication Data

US 2024/0284560 A1     Aug. 22, 2024

Related U.S. Application Data

(63) Continuation of application No. 17/181,320, filed on Feb. 22, 2021, now Pat. No. 11,917,726, which is a continuation of application No. 16/199,303, filed on Nov. 26, 2018, now Pat. No. 10,932,319, which is a continuation of application No. 14/844,541, filed on Sep. 3, 2015, now Pat. No. 10,143,038.

(51) Int. Cl.
*H04W 84/18*          (2009.01)
*G01D 21/00*          (2006.01)

(52) U.S. Cl.
CPC ............ *H04W 84/18* (2013.01); *G01D 21/00* (2013.01)

(58) Field of Classification Search
None
See application file for complete search history.

(56) References Cited

U.S. PATENT DOCUMENTS

| | | | |
|---|---|---|---|
| 7,379,981 | B2 | 5/2008 | Elliott et al. |
| 8,103,389 | B2 | 1/2012 | Golden et al. |
| 9,534,929 | B1 | 1/2017 | Stamatakis et al. |
| 9,534,930 | B1 | 1/2017 | Stamatakis |
| 9,538,578 | B1 | 1/2017 | Stamatakis et al. |
| 9,551,594 | B1 | 1/2017 | Stamatakis |
| 9,554,236 | B1 | 1/2017 | Stamatakis |
| 9,714,843 | B1 | 7/2017 | Stamatakis et al. |
| 9,714,844 | B1 | 7/2017 | Stamatakis et al. |
| 9,756,511 | B1 | 9/2017 | Stamatakis et al. |
| 9,762,979 | B1 | 9/2017 | Stamatakis et al. |
| 9,763,118 | B1 | 9/2017 | Stamatakis et al. |
| 9,800,646 | B1 | 10/2017 | Stamatakis et al. |
| 9,813,489 | B1 | 11/2017 | Stamatakis et al. |
| 9,876,653 | B1 | 1/2018 | Stamatakis |
| 9,888,336 | B1 | 2/2018 | Stamatakis |

(Continued)

OTHER PUBLICATIONS

Cloud Logger, 38 Zeros, 2015.

(Continued)

*Primary Examiner* — Thomas S McCormack

(57) ABSTRACT
A system, method and apparatus for enabling environment tracking at a monitored location. A wireless sensor network can support a beacon that can be configured to broadcast information to devices at the monitored location. The broadcasted information can be recorded by devices to generate an environment log that can enable identification of conditions of an environment as reflected by sensor measurements at the monitored location.

20 Claims, 8 Drawing Sheets

(56) References Cited

U.S. PATENT DOCUMENTS

| | | | |
|---|---|---|---|
| 9,942,693 B2 | 4/2018 | Stamatakis | |
| 9,986,411 B1 | 5/2018 | Stamatakis | |
| 10,142,196 B1 | 11/2018 | Stamatakis et al. | |
| 10,143,038 B1 | 11/2018 | Stamatakis | |
| 10,149,141 B1 | 12/2018 | Stamatakis et al. | |
| 10,171,891 B1 | 1/2019 | Stamatakis | |
| 10,171,972 B2 | 1/2019 | Stamatakis et al. | |
| 10,178,638 B1 | 1/2019 | Stamatakis et al. | |
| 10,237,631 B2 | 3/2019 | Stamatakis et al. | |
| 10,263,841 B1 | 4/2019 | Stamatakis et al. | |
| 10,313,149 B2 | 6/2019 | Stamatakis | |
| 10,313,197 B1 | 6/2019 | Stamatakis | |
| 10,334,417 B2 | 6/2019 | Stamatakis et al. | |
| 10,536,838 B2 | 1/2020 | Stamatakis | |
| 10,542,331 B2 | 1/2020 | Stamatakis | |
| 10,652,767 B1 | 5/2020 | Stamatakis | |
| 10,687,231 B1 | 6/2020 | Stamatakis | |
| 10,798,554 B2 | 10/2020 | Stamatakis et al. | |
| 10,805,697 B2 | 10/2020 | Stamatakis et al. | |
| 10,833,893 B2 | 11/2020 | Stamatakis et al. | |
| 10,932,319 B2 | 2/2021 | Stamatakis | |
| 10,951,961 B2 | 3/2021 | Stamatakis et al. | |
| 10,992,493 B2 | 4/2021 | Stamatakis | |
| 10,993,097 B1 | 4/2021 | Stamatakis et al. | |
| 11,089,388 B2 | 8/2021 | Stamatakis et al. | |
| 11,089,390 B2 | 8/2021 | Stamatakis | |
| 11,184,257 B2 | 11/2021 | Stamatakis et al. | |
| 11,197,146 B2 | 12/2021 | Stamatakis et al. | |
| 11,259,099 B2 | 2/2022 | Stamatakis et al. | |
| 11,457,292 B2 | 9/2022 | Stamatakis et al. | |
| 11,470,462 B2 | 10/2022 | Stamatakis et al. | |
| 11,509,976 B2 | 11/2022 | Stamatakis et al. | |
| 11,528,161 B2 | 12/2022 | Stamatakis | |
| 11,546,677 B2 | 1/2023 | Stamatakis | |
| 11,595,926 B2 | 2/2023 | Stamatakis et al. | |
| 11,617,027 B2 | 3/2023 | Stamatakis et al. | |
| 11,683,616 B2 | 6/2023 | Stamatakis | |
| 11,722,365 B2 | 8/2023 | Stamatakis et al. | |
| 11,757,738 B2 | 9/2023 | Stamatakis et al. | |
| 11,765,489 B2 | 9/2023 | Stamatakis et al. | |
| 11,765,490 B2 | 9/2023 | Stamatakis et al. | |
| 11,812,288 B2 | 11/2023 | Stamatakis | |
| 11,817,966 B2 | 11/2023 | Stamatakis | |
| 11,825,547 B2 | 11/2023 | Stamatakis et al. | |
| 11,843,511 B2 | 12/2023 | Stamatakis | |
| 11,913,654 B1 | 2/2024 | Stamatakis | |
| 11,917,726 B2 | 2/2024 | Stamatakis | |
| 2003/0227392 A1 | 12/2003 | Ebert | |
| 2007/0211681 A1 | 9/2007 | Sun et al. | |
| 2008/0007445 A1 | 1/2008 | Leach | |
| 2009/0300379 A1 | 12/2009 | Mian | |
| 2011/0002241 A1* | 1/2011 | Phan | H04W 8/08 |
| | | | 370/254 |
| 2014/0028462 A1 | 1/2014 | Lawson | |
| 2014/0283144 A1 | 9/2014 | Gettings | |
| 2014/0324615 A1 | 10/2014 | Kulkarni | |
| 2015/0151960 A1 | 6/2015 | McCleland | |
| 2015/0192475 A1 | 7/2015 | Eisenstadt | |
| 2015/0254950 A1 | 9/2015 | Patterson | |
| 2015/0316945 A1 | 11/2015 | Soya | |
| 2016/0112518 A1 | 4/2016 | Haleem et al. | |
| 2016/0359931 A1 | 12/2016 | Goncharov | |
| 2018/0069745 A1* | 3/2018 | Wang | H04L 41/22 |

OTHER PUBLICATIONS

Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.

Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
3$^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxure Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
DOLPHIN Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™M—Balancing Efficiency with Comfort, Automated Logic Corporation, 2013.
Equipment Portal, Automated Logic Corporation, 2013.
EnergyReports™M Web Application—A Tool for Sustainable Building Operations, Automated Logic Corporation, 2013.
WebCTRLR—Powerful and Intuitive Front End for Building Control, Mar. 26, 2015.
iSelect Adds New Portfolio Company: Bractlet, 2015.
Know—Bractlet.
Analyze—Bractlet.

(56) References Cited

OTHER PUBLICATIONS

Ensure—Bractlet.

Announcing Samsara: Internet connected sensors, May 18, 2015.

Samsara—Internet Connected Sensors.

Samsara—Features.

Samsara—Models.

Samsara—API.

Press Release, Helium Makes Sense of the Internet of Things, Oct. 27, 2015.

Press Release, Helium Introduces Another Smart Sensor for Environmental Monitoring, Apr. 25, 2016.

Press Release, Helium Announces Helium Pulse Monitoring and Alerting Application, Apr. 25, 2016.

EE Times, IoT Startup Revises 802.15.4 Nets, Oct. 27, 2015.

Helium Pulse™ for Monitoring and Alerting, 2016.

Helium Green™ Environmental Smart Sensor, 2016.

Helium Blue™ Temperature & Door Smart Sensor, 2016.

* cited by examiner

| Date/Time | Sensor 1 | Alert | Beacon UUID |
|---|---|---|---|
| 18:00:47 Jan-18 2015 | 53.84° F | High Temp | 6332 |
| 17:45:23 Jan-18 2015 | 53.85° F | High Temp | 6332 |
| 17:30:15 Jan-18 2015 | 53.83° F | High Temp | 6332 |
| 17:15:58 Jan-18 2015 | 50.34° F | | 7734 |
| 17:00:54 Jan-18 2015 | 50.33° F | | 7734 |
| . . . | . . . | | . . . |
| 16:45:47 Jan-18 2015 | 50.35° F | | 7734 |
| 16:30:23 Jan-18 2015 | 50.35° F | | 7734 |
| 16:15:02 Jan-18 2015 | 50.32° F | | 7734 |
| 16:00:58 Jan-18 2015 | 50.32° F | | 7734 |
| 15:45:54 Jan-18 2015 | 50.32° F | | 7734 |

SYSTEM, METHOD AND APPARATUS FOR ENABLING ENVIRONMENTAL TRACKING AT A MONITORED LOCATION

This application is a is a continuation of non-provisional application Ser. No. 17/181,320, filed Feb. 22, 2021, which is a continuation of non-provisional application Ser. No. 16/199,303, filed Nov. 26, 2018, which is a continuation of non-provisional application Ser. No. 14/844,541, filed Sep. 3, 2015. Each of the above-identified applications are incorporated herein by reference in their entireties.

BACKGROUND

Field

The present disclosure relates generally to sensor applications, including a system, method and apparatus for enabling environment tracking at a monitored location.

Introduction

Sensors can be used to monitor physical environment conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which:

FIG. 8 illustrates an example of an environment log.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Figure 1:
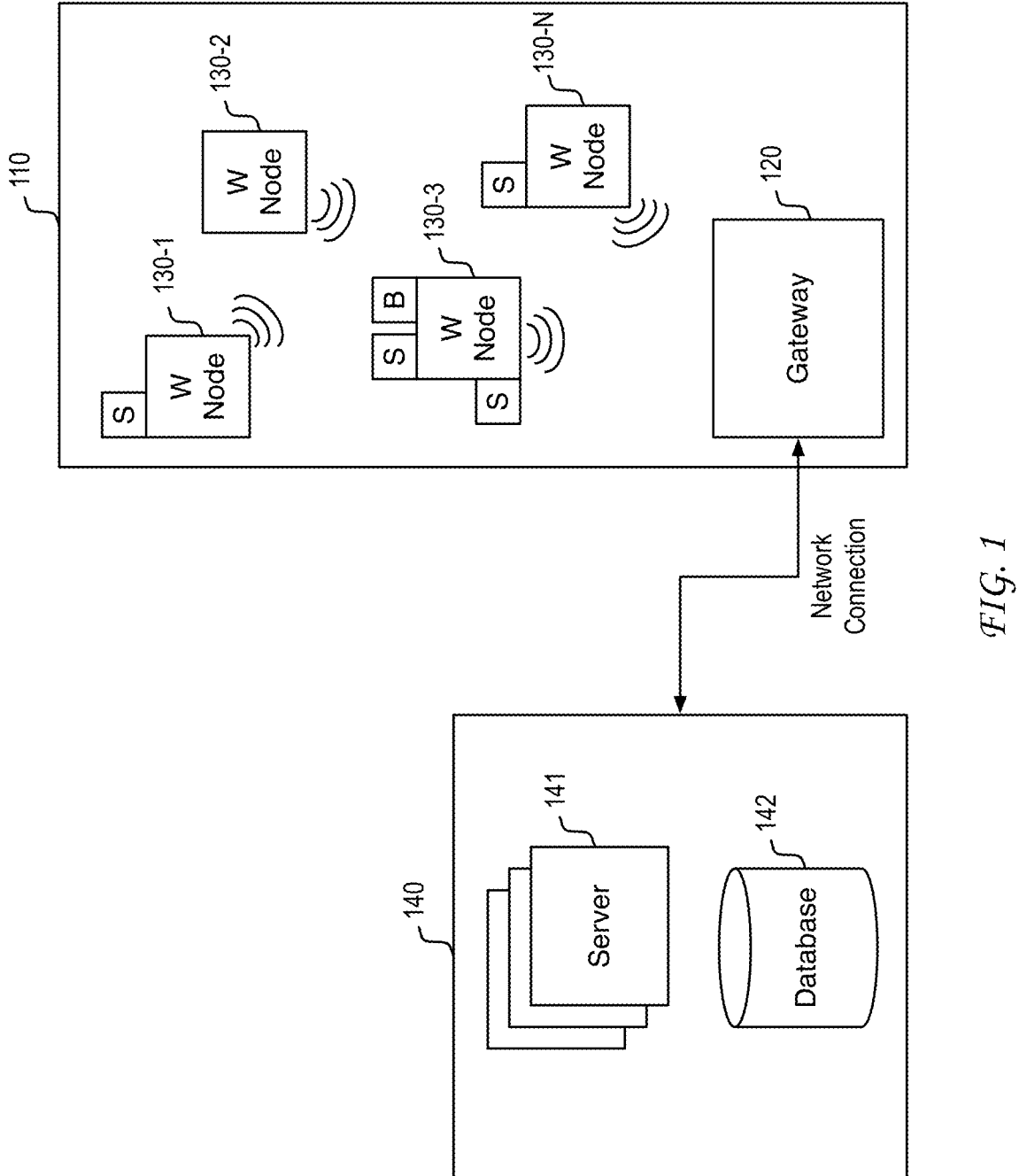
FIG. 1 illustrates an example embodiment of a wireless sensor network that can collect and distribute sensor information.

Sensors provide a mechanism for discovering and analyzing the state of an environment of a monitored location. FIG. 1 illustrates an example embodiment of a wireless sensor network that can collect and distribute sensor information based on measurements by sensors deployed at monitored location 110.

Monitored location 110 can represent any area where one or more sensors are deployed. Monitored location 110 may or may not represent a physical area having clearly defined boundaries. As would be appreciated, the extent of the monitoring application itself provides a sense of boundary to monitored location 110. In one example, monitored location 110 can represent a building such as a home, hotel, school, community building, stadium, convention center, warehouse, office building, multi-dwelling unit, or other defined building structure. In another example, monitored location 110 can represent an area of control such as a vehicle or container in any mode of transport, an asset collection area, a construction zone, or any monitored area that can be fixed or movable.

Disposed within monitored location 110 is a plurality of sensors. Sensors can be included within the various sensor module units (S) that are supported by wireless nodes 130-*n*. Wireless nodes 130-*n* can be configured to form a wireless mesh network that enables communication between the plurality of sensor module units and gateway device 120. In one embodiment, the communication protocol between wireless nodes 130-*n* is based on the IEEE 802.15.4 protocol. The wireless mesh network can be used to facilitate communication in an upstream direction toward operation center 140 via gateway device 120 and in a downstream direction toward a particular sensor module unit supported by one of the wireless node 130-*n*.

A wireless node 130-*n* can be configured to support one or more sensor module units, each of which can be individually coupled to a wireless node 130-*n* via a plug-and-play universal sensor interface. The plug-and-play universal sensor interface facilitates the separation of the wireless node communication infrastructure from the set of one or more sensor module units that are deployed at the location at which the supporting wireless node 130-*n* is installed. This separation creates significant flexibility in choice of sensors that may or may not be deployed proximate to the time of installation of the supporting wireless node 130-*n*. As such, the plug-and-play universal sensor interface enables a sensor network solution that can respond to changes in the sensor application requirements at monitored location 110 without incurring significant re-deployment costs.

In one example, wireless node 130-*n* can be configured to support four sensor module units. As would be appreciated, the particular number of sensor module units that can be supported by a wireless node 130-*n* can vary. Sensor module units can be added onto wireless nodes 130-*n* sequentially at different deployment times. Thus, for example, a first sensor module unit can be added at a time of installation of the wireless node 130-*n*, with one or more additional sensor module units added to the same wireless node 130-*n* as needed in the future to address changing sensor application objectives.

In one embodiment, each of the sensor module units can support a set of one or more sensors. In one example, a sensor module unit can support a set of eight sensors. In this example, the set of eight sensors can include sensors of one or more types. For example, sensors in a sensor module unit can enable one or more of the following: a temperature sensor application, a humidity sensor application, an air quality (e.g., $CO_2$) sensor application, a light sensor application, a sound sensor application, a radiation sensor application, a contact sensor application, a pulse sensor application, a water sensor application, a power sensor application, or any other type of sensor application configured to measure a characteristic of an environment of a part of monitored location 110.

A sensor module unit can include multiple sensors of a single type. For example, a particular configuration of a sensor module unit can include four pulse sensors, one temperature sensor, one humidity sensor, one air quality sensor, and one light sensor. In another example, a particular configuration of a sensor module unit can include eight sensors of a single type. As would be appreciated, the set of sensors included within a particular sensor module unit can be chosen to meet a given sensor application objective.

Wireless node 130-1 is illustrated as supporting a single sensor module unit (S). Wireless node 130-2, on the other hand, is illustrated as not supporting any sensor module units. This example illustrates a scenario where wireless node 130-2 has been installed as a wireless relay node to facilitate a connection between wireless node 130-1 and gateway 120. As further illustrated, wireless node 130-3 supports three different sensor module units. One of the three sensor module units is labeled as a beacon sensor module unit (B), which enables a broadcast of information that enables identification of a condition of an environment of monitored location 110 as detected by at least one sensor in monitored location 110. The beacon sensor module unit is described in greater detail below.

As noted, the wireless mesh network created by wireless nodes 130-n facilitates communication between the sensor module units and gateway 120. Gateway 120 can be installed at monitored location 110 and can be provided with network connectivity. For example, gateway 120 can be provided with a network connection that facilitates communication between gateway 120 and operation center 140. The network connection can be embodied in various forms depending upon the particular characteristics of monitored location 110.

For example, where monitored location 110 is a building in a developed area, then the network connection can be facilitated by a wired Internet connection via an Internet service provider (ISP). In another example, the network connection can be facilitated by a terrestrial or satellite based wireless network to accommodate a remote physical area (or movable area) that may or may not include a building structure. As would be appreciated, the principles of the present disclosure would not be dependent on the particular form of network connection supported by gateway 120 in communicating with operation center 140. Here, it should be noted that multiple gateways can be used at a monitored location, wherein each gateway supports a different set of wireless nodes and has a separate network connection to an operation center.

The network connection between gateway 120 and operation center 140 enables the collection of sensor data by operation center 140. In one embodiment, operation center 140 can be located in a location remote from gateway 120. In general, operation center 140 can be configured to perform a collection of sensor data from monitored location 110, processing of collected sensor data, storage of sensor information in database 142, and a distribution of sensor information to one or more destinations. As illustrated, operation center 140 can include one or more servers 141 that can facilitate the collection, processing, storage and distribution processes.

Figure 2:
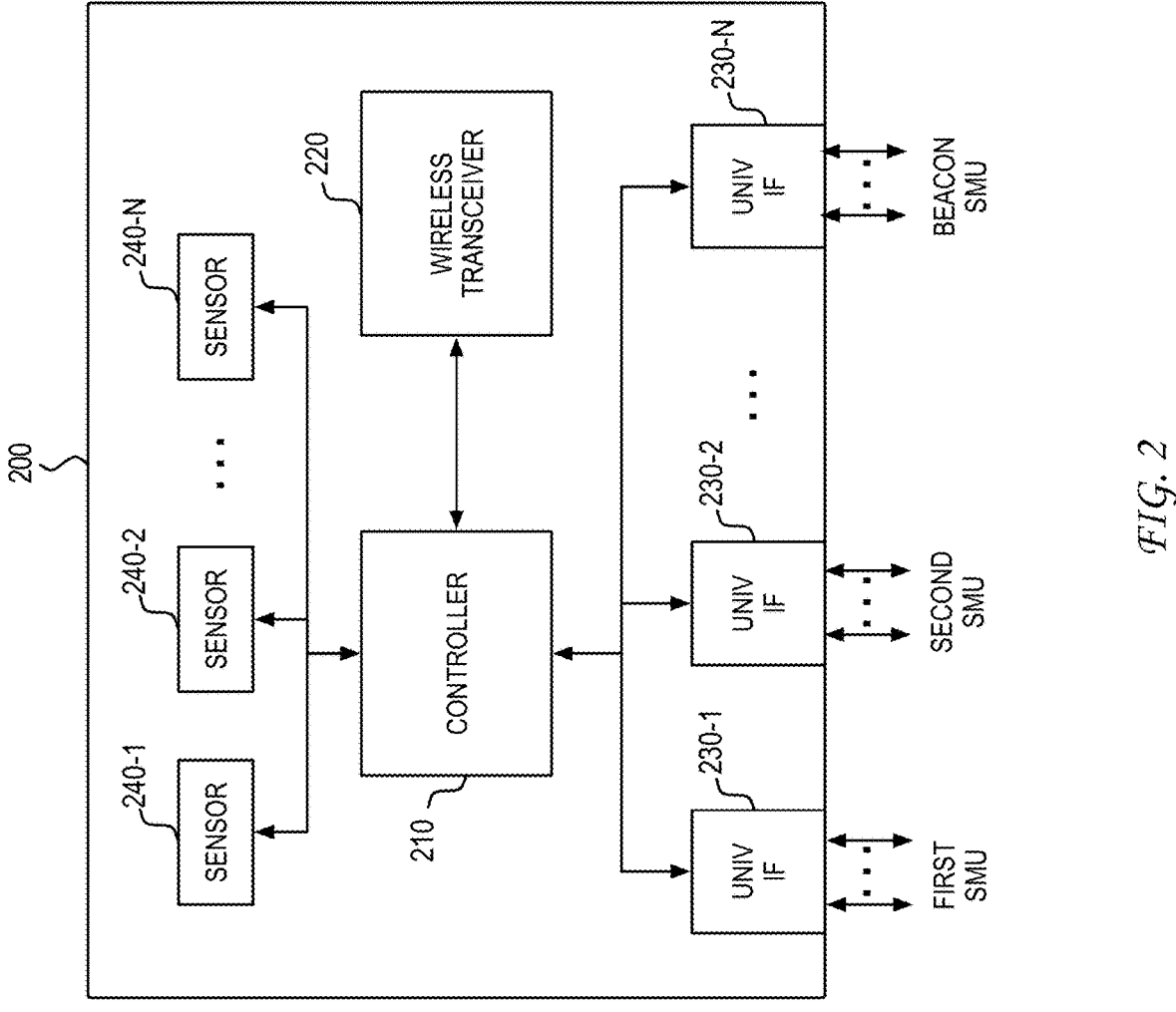
FIG. 2 illustrates an example embodiment of a wireless node.

Wireless nodes 130-n provide a wireless network infrastructure upon which sensor module units, such as a beacon sensor module unit, can be deployed for a customized sensor application. FIG. 2 illustrates an example embodiment of a wireless node. As illustrated, wireless node 200 includes controller 210 and wireless transceiver 220. In one embodiment, wireless node 200 can be powered via a battery source (not shown). In another embodiment, wireless node 200 can be powered via an external power source available at the point of installation at the monitored location.

Wireless transceiver 220 facilitates wireless communication between wireless node 200 and a gateway or another wireless node that operates as a relay between wireless node 200 and the gateway. Controller 210 collects sensor measurements from the set of sensor module units via one or more universal sensor interfaces 230-n. Each universal sensor interface 230-n can support the connection of wireless node 200 with a separate sensor module unit. FIG. 2 illustrates the connectivity of wireless node 200 in the example of wireless node 130-3 of FIG. 1. In this example, wireless node 200 would connect to a first sensor module unit using universal interface 230-1, would connect to a second sensor module unit using universal interface 230-2, and would connect to a beacon sensor module unit using universal interface 230-N.

Universal sensor interfaces 230-n can represent a combination of hardware and software. The hardware portion of universal sensor interfaces 230-n can include a wired interface that enables communication of different signals between wireless node 200 and a connected sensor module unit. In one example, the wired interface can be enabled through a connector interface, which is exposed by the housing of the wireless node 200, and that is configured to receive a sensor module unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 210 in wireless node 200 to select the particular sensor module unit with which wireless node 200 desires to communicate.

The connection of sensor module units to wireless nodes via a universal sensor interface enables an abstraction of the sensor interface from the wireless network infrastructure. In particular, the provision of a universal interface between wireless node 200 and one or more sensor module units moves the sensor-specific interface to the sensor module unit. Thus, a modification of a sensor module unit (e.g., to support a new sensor for a new sensor application) would not impact wireless node 200. This would obviate the need to re-qualify the wireless node when introducing a different sensor module unit for a new sensor application.

The software portion of the universal sensor interfaces 230-n can include a protocol that allows wireless node 200 to communicate with a sensor module unit. In one example protocol, controller 210 can be configured to poll the various universal sensor interfaces 230-n to determine whether any sensor module units are connected. As part of this protocol, controller 210 can first request a sensor ID from a sensor module unit. If the response read is 0, then controller 210 would know that no sensor module unit is connected to that universal sensor interface 230-n. If, on the other hand, the response read is not 0, then controller 210 would ask for the number of data values that have to be retrieved and the number of bits on which the data values are coded. In one example, the higher order 8-bits of a 16-bit communication between controller 210 and a sensor module unit identifies the number of data values, while the lower order 8-bits of the 16-bit communication identifies the number of bits used to code each data value. Based on the number of data values to be retrieved, controller 210 would then collect that number of data values, wherein each value can represent a different sensor channel of the sensor module unit.

In one example, a wireless node can be configured for coupling to four different sensor module units. If each of the sensor module units can include up to eight sensors, then the wireless node can be configured to communicate 32 sensor channels of data to the gateway via wireless transceiver 220. As would be appreciated, a wireless node can be configured for coupling to any application-specific number of sensor module units, wherein each sensor module unit contains an application-specific number of sensors.

In the illustration of FIG. 2, wireless node 200 also includes one or more sensors 240-n. In one example, sensors 240-n can be contained within or otherwise supported by the housing of wireless node 200. In various scenarios, the one or more sensors 240-n can facilitate monitoring at that part of the monitored location, including the health and/or status of wireless node 200. In one example configuration, sensors 240-n can include a temperature sensor, a humidity sensor, a voltage sensor, a link quality sensor, or any other sensor that can be used to facilitate the sensing needs of wireless node 200.

As noted, wireless nodes can be designed as a generic communication node upon which customized sensing functionality can be added through the connection of particular sensor module units. In this framework, the wireless nodes can be constructed with base communication functionality that can operate independently of particular sensors. As such, the wireless nodes can provide a relatively stable wireless network infrastructure that can support multiple generations of sensor module units. As would be appreciated, the requirements of the sensor module units would be dependent on the particular sensing application. For example, a first sensor module unit can be designed with a first generation sensor having a first degree of accuracy, reliability, or other sensor characteristic, while a second sensor module unit can be designed with a second generation sensor of the same type having a second degree of accuracy, reliability, or other sensor characteristic. As this example illustrates, different generations of sensor module units can be attached to the same wireless node using the plug-and-play universal sensor interface. The original investment in the wireless node would not be lost should the second sensor module unit replace the originally installed first sensor module unit. A low-cost evolutionary path of the wireless sensor network would therefore be enabled that could scale seamlessly with a customer's needs, sensor technology, or other factor that implicates a sensor module unit modification.

Figure 3:
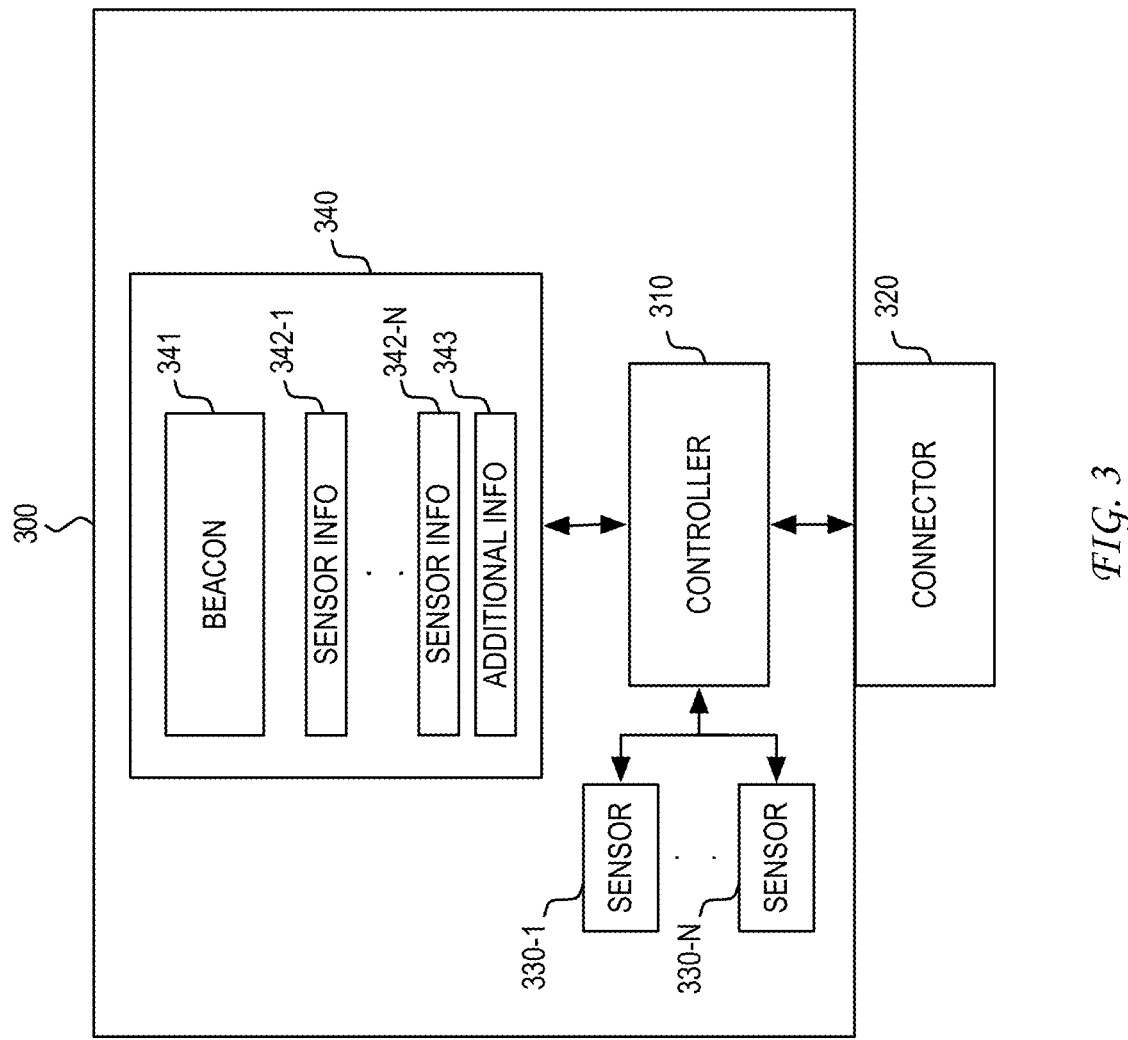
FIG. 3 illustrates an example embodiment of a sensor module unit.

FIG. 3 illustrates an example embodiment of a sensor module unit designed for attachment to a wireless node. As illustrated, sensor module unit 300 includes controller 310 that communicates over a universal sensor interface with the wireless node. In one embodiment, sensor module unit 300 supports the universal sensor interface with a connector 320 configured for pluggable, removable insertion into a corresponding connector interface exposed by the wireless node. In another embodiment, the sensor module unit can be coupled to the connector interface exposed by the wireless node via a connector attached to a cable.

Sensor module unit 300 can include a plurality of sensors 330-n. In one example, sensor module unit 300 includes up to eight sensors of one or more types. A sensor module unit can be pre-populated with a suite of sensors targeted to a particular class of sensor applications. In this framework, a first suite of sensors can be used in a first sensor module unit targeted to a first sensor application (e.g., school buildings), while a second suite of sensors can be used in a second senor module unit targeted to a second sensor application (e.g., office buildings) different from the first sensor application. Here, the underlying wireless network infrastructure can remain the same while particular sensor module units are chosen for coupling to one or more wireless nodes to facilitate a particular sensor application at a monitored location.

Where sensor module unit 300 operates as a beacon sensor module unit, then sensor module unit 300 can also include beacon section 340. In general, beacon section 340 enables a broadcast of information that enables identification of a condition of an environment of the monitored location as detected by at least one sensor in the monitored location. Beacon section 340 can therefore function as a broadcast source of information pertinent to the current condition of the environment of the monitored location.

In one example application, the broadcasted information can be used to generate an environment log. This environment log can be configured to correspond to the duration of time that a device is in proximity to the beacon sensor module unit. When the receiving device enters into proximity to the beacon sensor module unit, then the entry of broadcasted information into the environment log can begin, and when the receiving device enters is removed from proximity to the beacon sensor module unit, then the entry of broadcasted information into the environment log would end. The environment log can therefore represent a recording of broadcasted information that can identify a history of the condition of the environment in the monitored location.

One example application of such an environment log is the verification of the condition of the environment for the needs of a device or associated article. In one scenario, the device can be a tag device that is attached to an article requiring particular conditions of the environment. For example, where the beacon sensor module unit is configured to broadcast information that can identify a temperature of the environment, then the environment log of the tag device can yield a history of the ambient temperature of the storage area in which the asset resided. In one application, this environment log can be used to prove that a manufacturing company, shipping company, distributing company, or any other entity taking possession of the asset, has provided the proper condition of the environment for the asset while the asset was under their control. In this example, the environment log would provide a measure of verification as to the proper handling of the asset by all parties in the distribution chain.

More generally, the environment log can be used in many different applications depending on the particular sensor measurement(s) reflected by the broadcasted information. In one class of applications, the broadcasted information can enable identification of an ambient condition in the environment. For example, the broadcasted information can enable identification of the humidity, air quality (e.g., $CO_2$), light, radiation, or any other physical condition of the environment. The environment log can then enable identification of a history of a particular physical condition of the environment.

In another class of applications, the broadcasted information can enable identification of interaction of a device or associated asset with the environment. For example, the broadcasted information can enable identification of the consumption, production, or other measurable impact on electricity, water, fuel, or other resource. The environment log can then enable identification of a history of the interaction with the environment.

In yet another class of applications, the broadcasted information can enable identification of events related to a monitored location, device or associated asset. For example, the broadcasted information can enable identification of incidents of access to the monitored location, device or associated asset by individuals, machines or other accessing entities. In various scenarios, the broadcasted information can enable identification of a time of access, events during access, captured credentials (e.g., IDs, biometrics, or other identifying information) of the accessing party, and/or results of the incidents of access. In another example, the broadcasted information can enable identification of usage of the monitored location, device or associated asset. In various scenarios, the broadcasted information can enable identification of details on whether the monitored location, device or associated asset was moved, used, maintained, or otherwise interacted with. In these various examples, the environment log can then enable identification of a history of the interaction with a device or associated asset.

As would be appreciated, the above examples are not exhaustive of the potential applications enabled through the broadcast of information that enables identification of a condition related to an environment of a monitored location.

Returning to the example illustration of FIG. 3, beacon section 340 can include wireless beacon transmitter 341, which is configured to wirelessly broadcast information to a plurality of devices that are in proximity to wireless beacon transmitter 341. In one embodiment, wireless beacon transmitter 341 is a radio frequency identification (RFID) beacon transmitter. In another embodiment, wireless beacon transmitter 341 is a Bluetooth beacon transmitter. As would be appreciated, wireless beacon transmitter 341 can be based on any technology (e.g., ZigBee, Wi-Fi, WiMax, or other wireless communication) that can cover at least part of a monitored location when broadcasting information to one or more devices.

Wireless beacon transmitter 341 can be configured to broadcast information that enables identification of an updated condition of an environment. In the embodiment illustrated in FIG. 3, the updated information to be broadcast by wireless beacon transmitter can be retrieved from a plurality of sensor information fields 342-n and additional information field 343. The plurality of sensor information fields 342 and the additional information field 343 can each be implemented by one or more registers or other updatable storage locations accessible by wireless beacon transmitter 341.

In one example, sensor information fields 342 can include sensor measurement information that is provided by one or more sensors 330-n in sensor module unit 300. In this example, measurements taken by one or more sensors 330-n can be collected by controller 310 and routed to beacon section 340 for updating of one or more sensor information fields 342-n. The updated information contained in one or more sensor information fields 342-n would then be retrieved by wireless beacon transmitter 341 and broadcast to a plurality of devices. In this manner, wireless beacon transmitter 341 would broadcast information that is based on the latest and most current sensor measurement(s). Devices that continuously receive the broadcasted information while in the monitored location would then be able to create an environment log that accurately captures the historical conditions in the environment of the monitored location as identified by the sensor measurement(s).

In one embodiment, controller 310 can control the rate at which the one or more sensor information fields 342-n are updated. For example, controller 310 can be configured to update the one or more sensor information fields 342-n every 15 minutes. Where additional granularity is needed in the environment log, controller 310 can be configured to update the one or more sensor information fields 342-n every 5 minutes. In general, the rate at which controller 310 would update the one or more sensor information fields 342-n can be specified by the customer. In another example, the controller can initiate an update of one or more sensor information fields 342-n when it is determined that a significant change has occurred. For instance, if the sensor measurement indicates that a greater than X % change from the previous sensor measurement has occurred, then the one or more sensor information fields 342-n can be immediately updated. In yet another example, the controller can initiate an update of one or more sensor information fields 342-n based upon a command initiated by the operation center. For instance, the command to initiate an update can be transmitted when it is determined that a disruption in the monitored location has been detected. In general, the triggering of the one or more sensor information fields 342-n can be performed in a variety of ways to ensure that the broadcasted information accurately reflects the conditions of the environment at the monitored location.

In one example, one or more additional information fields 343 can be configured to capture additional processed information relevant to the conditions of an environment of the monitored location. In one scenario, the additional processed information can represent alarm information associated with conditions in the environment. In general, the one or more additional information fields 343 can store information generated by a sensor module unit, a wireless node, a gateway device, or an operation center.

Figure 4:
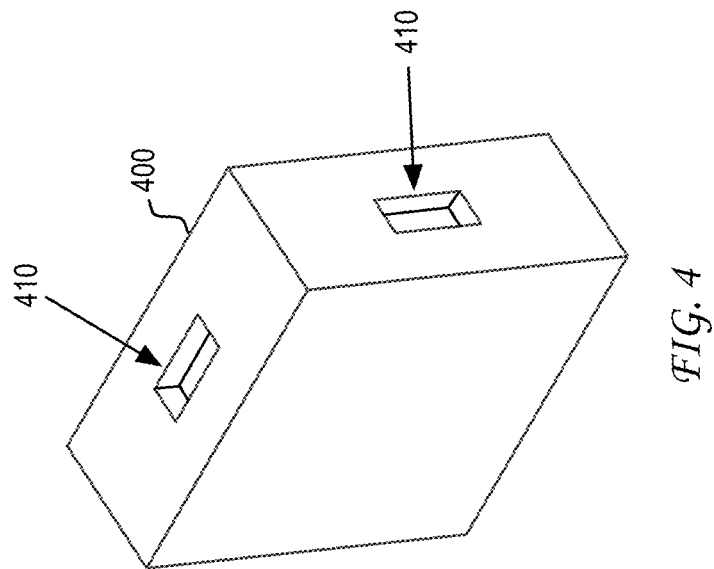
FIG. 4 illustrates an example embodiment of a housing of a wireless node that exposes connector interfaces.

The plug-and-play nature of the connection of sensor module units to supporting wireless nodes facilitates a modular framework for installation of one or more beacons in a monitored location. FIG. 4 illustrates an example embodiment of a housing of a wireless node such as the example illustration of wireless node 200 in FIG. 2. As illustrated, wireless node 400 can have a housing configured to expose a plurality of connector interfaces 410. Each of the plurality of connector interfaces 410 can support the physical attachment of a single sensor module unit. In the example illustration, each side of the housing of wireless node 400 exposes a single connector interface 410. In the present disclosure, it is recognized that the housing of the wireless node can be substantially larger than the housing of the sensor module unit. This can result, for example, because the wireless node can be designed with additional components such as an internal power source (e.g., battery) that can involve additional volume requirements as compared to the sensor module units. It is therefore recognized that one embodiment of a wireless node can have multiple sensor module units physically attached to a single side of the wireless node.

Figure 5:
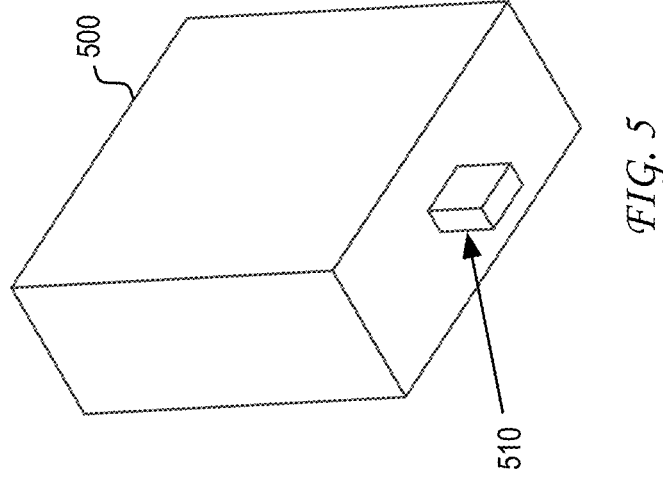
FIG. 5 illustrates an example embodiment of a housing of a sensor module unit.

FIG. 5 illustrates an example embodiment of a housing of a sensor module unit such as the example illustration of sensor module unit 300 in FIG. 3. As illustrated, sensor module unit 500 can have a housing configured to support a connector 510. Connector 510 can be configured for pluggable, removable insertion into a corresponding connector interface 410 exposed by the housing of wireless node 400. The connection of sensor module unit 500 to wireless node 400 via the insertion of connector 510 into connector interface 410 produces a true plug-and-play framework for the deployment of beacons in a wireless sensor network.

Figure 6:
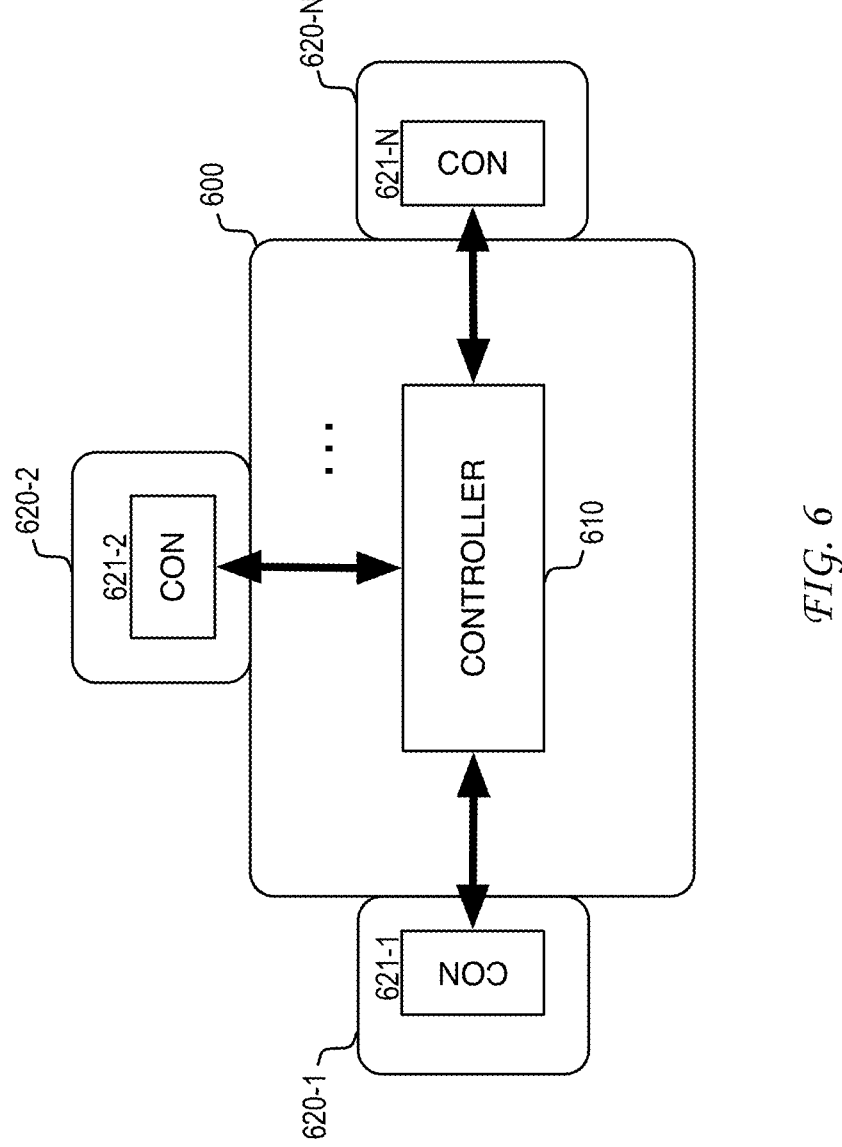
FIG. 6 illustrates an example embodiment of a wireless node attached to a plurality of sensor module units.

FIG. 6 illustrates an example data flow in a wireless node such as the example illustration of wireless node 200 in FIG. 2. As illustrated, wireless node 600 interfaces with a plurality of sensor module units, including sensor module unit 620-1, sensor module unit 620-2, and sensor module unit 620-N. Connectors of sensor module unit 620-1, sensor module unit 620-2, and sensor module unit 620-N are each physically attached to separate connector interfaces exposed by the housing of wireless node 600.

The attachment of sensor module unit 620-1 to wireless node 600 enables communication of data between controller 621-1 and controller 610. The attachment of sensor module unit 620-2 to wireless node 600 enables communication of data between controller 621-2 and controller 610. Finally, the attachment of sensor module unit 620-N to wireless node 600 enables communication of data between controller 621-N and controller 610. By this attachment, each of sensor module units 620-1, 620-2 and 620-N can be coupled to wireless node 600 via a universal sensor interface having the connectivity characteristics described above.

In this example, assume that sensor module unit 620-N is a beacon sensor module unit. As described above, the wireless beacon transmitter in beacon sensor module unit 620-N can be configured to wirelessly broadcast information that can enable identification of a condition of an environment as reflected by sensor measurements taken by sensors in beacon sensor module unit 620-N. In addition, the wireless beacon transmitter in beacon sensor module unit 620-N can also be configured to wirelessly broadcast information that can enable identification of a condition of an environment as reflected by sensor measurements provided to controller 621-N in beacon sensor module unit 620-N by controller 610 in wireless node 600. The information that is provided by wireless node 600 to controller 621-N in beacon sensor module unit 620-N can be based on sensor measurements taken anywhere in the wireless sensor network.

In a first scenario, the information can be based on sensor measurements taken by another sensor module unit attached to wireless node 600. For example, information based on measurements by one or more sensors in sensor module unit 620-1 can be transmitted to controller 610 in wireless node 600. The information can be further processed by controller 610 before being transmitted to controller 621-N in beacon sensor module unit 620-N. In various applications, controller 610 can be configured to analyze the information received from controller 621-1 to generate alerts, analytics, or other information associated with or derived from sensor measurements that would be useful to generate a history of a condition of the environment. Alternatively, controller 610 can forward the information to controller 621-N without further processing by controller 610.

In a second scenario, the information can be based on sensor measurements taken by a sensor module unit attached to another wireless node. For example, information based on measurements by one or more sensors in a sensor module unit attached to a different wireless node can be transmitted to wireless node 600 via the wireless mesh network. The information can be further processed by the different wireless node, by the gateway, by the operation center, or by controller 610 before being transmitted to controller 621-N in beacon sensor module unit 620-N. In one application, a plurality of wireless nodes can be dispersed within a monitored location at particular points targeted for sensing activity, while a particular wireless node having an attached beacon sensor module unit is positioned at a particular point in the monitored location to facilitate a wireless broadcast from the beacon. In one example arrangement, the plurality of wireless nodes targeted for sensing activity can be positioned on a periphery of a monitored location, while the wireless node having an attached beacon sensor module unit can be located in a central part of a monitored location.

As noted, in addition to the further processing by the wireless nodes, the information can also be further processed by one or more gateways or the operation center. This can illustrate a scenario where the desired processing of the information based on one or more sensor measurements is best performed by a higher-functioning element such as a gateway or an operation center.

Figure 7:
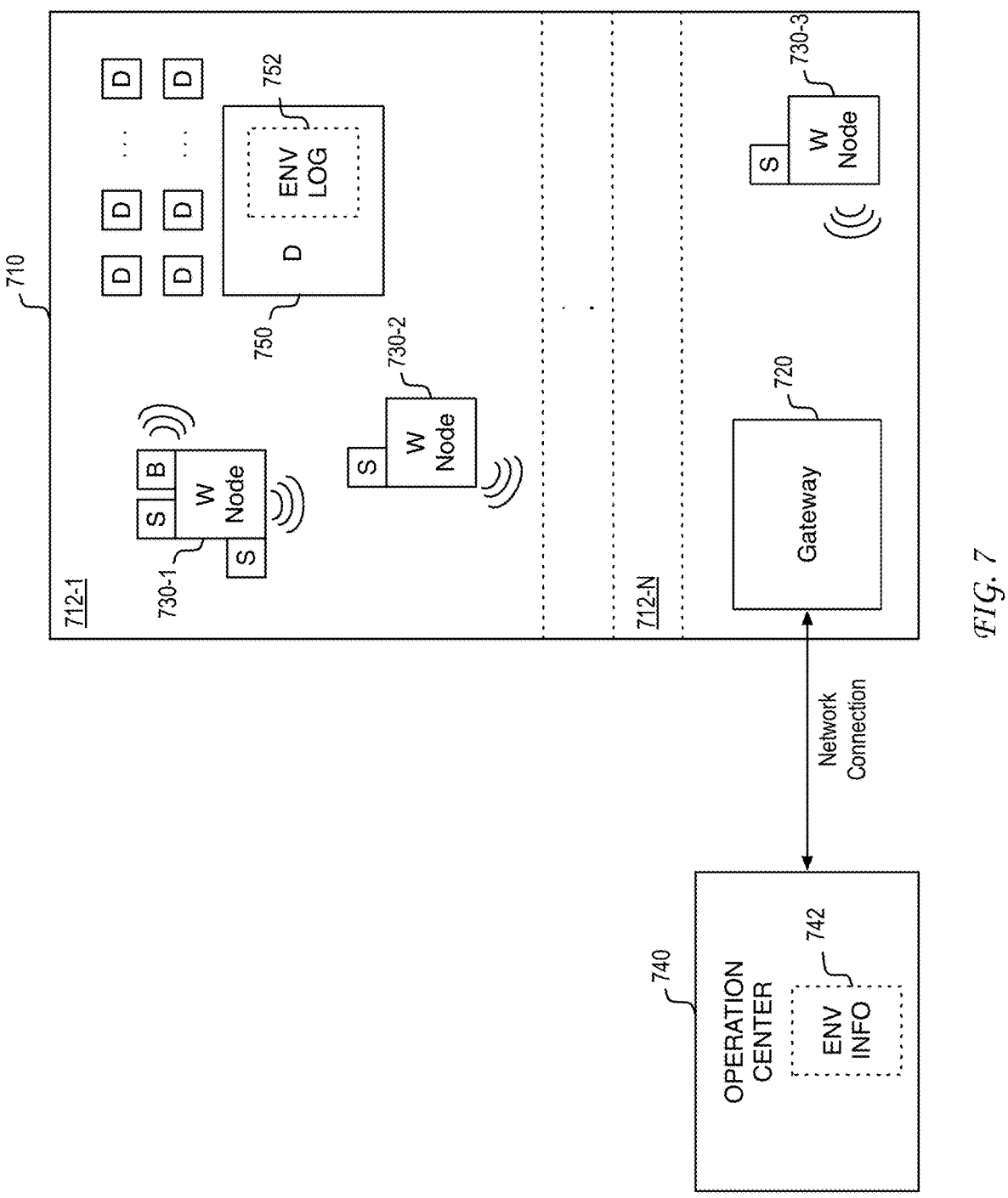
FIG. 7 illustrates an example application of a beacon sensor module unit.

To illustrate these further possibilities, reference is now made to FIG. 7, which illustrates an example application of a sensor module unit that includes a wireless beacon. As illustrated, monitored location 710 includes wireless node 730-1, wireless node 730-2, wireless node 730-2 and a plurality of devices (D). The plurality of devices can be embodied as tag devices, mobile computing devices, or any device that can benefit from receiving broadcasted beacon information. Wireless node 730-1 supports three different sensor module units that can be attached. One of the three sensor module units is a beacon sensor module unit that contains a beacon. Wireless node 730-2 and 730-3, on the other hand, each supports a single sensor module unit.

Monitored location 710 can include a plurality of areas 712-1 to 712-N that may or may not represent clearly demarcated portions of monitored location 710. In other words, areas 712-n may not have a particular correspondence to a defined area (e.g., room, storage area, or other part of monitored location 710 having a delineated boundary). In general, areas 712-n can represent parts of monitored location 710 in which a plurality of devices are in range of a wireless beacon transmitter in a beacon sensor module unit attached to a wireless node. For example, area 712-1 can represent a part of monitored location 710 in which a plurality of devices are in range of a wireless beacon transmitter in the beacon sensor module unit attached to wireless node 730-1.

Like the example wireless sensor network illustrated in FIG. 1, the wireless mesh network created by wireless nodes 730-n facilitates communication between the various sensor module units and gateway 720. Gateway 720 can be provided with a network connection that facilitates communication between gateway 720 and operation center 740. Again, the network connection can be embodied in various forms depending upon the particular characteristics of monitored location 710.

Information broadcasted by the beacon in the beacon sensor module unit attached to wireless node 730-1 can enable identification of a condition of an environment as reflected by one or more sensor measurements. In one example, the one or more sensor measurements can be performed by sensors in the beacon sensor module unit itself. In another example, the one or more sensor measurements can be performed by sensors in a different sensor module unit attached to wireless node 730-1. In another example, the one or more sensor measurements can be performed by sensors in a sensor module unit attached to a different wireless node such as wireless node 730-2 or wireless node 730-3. Here, it should be noted that the sensors may or may not be positioned within area 712-1.

Wireless nodes 730-n form a wireless mesh network. In one embodiment, the wireless mesh network enables information based on measurements by sensors in any sensor module unit to be routed to the beacon sensor module unit for broadcast. Thus, in this embodiment, information broadcasted by the beacon can be based on sensors scattered throughout monitored location 710.

In general, the information to be broadcasted can be processed (e.g., alerts) in any point in the wireless mesh network, including in a sensor module unit, a wireless node, a gateway, and/or an operation center. For example, information based on measurements by a sensor in a sensor module unit attached to wireless node 730-3 can be transmitted to gateway 720 for delivery to operation center. At each step of the information flow, wireless node unit 730-3, gateway 720 and/or operation center 740 can further process the information. The processed information can then be delivered to the beacon sensor module unit via gateway 720 and wireless node 730-1. As this example illustrates, the broadcasted information can provide receiving devices with information that can enable identification of sensed conditions in any part of the environment of monitored location 710.

The information broadcasted by the beacon in the beacon sensor module unit can change. These changes can be used to enable identification of changes in the sensed conditions in the environment. In the present disclosure, it is recognized that a device can be configured to record broadcasted information continuously. The recorded broadcasted information can be used to create an environment log that can enable identification of a history of the sensed conditions in the environment. For example, if the broadcasted information included temperature information, then the device could create a history of the ambient temperature of the environment in which the device resided for the time period in which the device was in proximity to the beacon. As would be appreciated, the history of the sensed environment conditions can relate to one or more sensor measurements of varying types.

In the illustration of FIG. 7, device 750 is shown as containing a memory for storing environment log 752. While the particular contents of environment log 752 would be implementation dependent, environment log 752 can be configured to record information that enables identification of a history of the environment conditions of monitored location 710 that would be relevant to the device.

To illustrate the usage of an environment log, reference is now made to the example of FIG. 8. As illustrated, example environment log 800 includes a plurality of entries divided into information columns 810, 820, 830 and 840. Column 810 can include information regarding date/time information. This date/time information can relate to a date/time the information was received by the device, a date/time the information was broadcasted by the beacon, the date/time a sensor measurement was performed, or any date/time information relevant to the tracking of a condition of an environment. Column 820 can include information based on a sensor measurement. In the example of FIG. 8, a single column is provided for sensor information. In other examples, information regarding a plurality of sensors can be included. Column 830 can include information based on a processing of information based on sensor measurement(s). In this example, information regarding an alert is included. For this simple example, the alert can be generated based on a threshold analysis of the temperature information to determine when the temperature in the environment has exceeded a maximum specified temperature threshold. In the example of FIG. 8, a High Temp alert has been triggered when the environment temperature broadcast by the beacon having UUID 6332 has exceeded a temperature threshold (e.g., 53° F.). This can be compared to the broadcast by the beacon having UUID 7734 of a lower environment temperature that has not exceeded the temperature threshold. Finally, column 840 can include information regarding a beacon's universally unique ID (UUID). This UUID information can be used to identify a particular area of the monitored location in which the device resided. Consider for example a scenario where a device is moved from a first area in the monitored location to a second area in the monitored location. The first area, which can be covered by a first beacon, can have different environment conditions as compared to a second area, which can be covered by a second beacon. As the device moves between different areas in the monitored location, the environment log can record the experience of the device with different environment conditions in the monitored location as reflected by the broadcasted information from different beacons. An accurate recording of the environment conditions actually experienced by the device can therefore by recreated by accessing the contents of environment log 800.

As illustrated in FIG. 7, operation center 740 can also be configured to store environment information 742, including information contained in environment log 752. For example, operation center 740 can be configured to record a history of the information that has been broadcast by each beacon in monitored location 710. This information can be recorded based on beacon UUIDs. Thus, to recreate an environment log of a particular device, the operation center can use the logged beacon UUIDs and the time span in which the device received broadcast information from each beacon UUID to recreate the broadcasted information received by the device. In this way, the environment log of the device could be recreated.

In one embodiment, the environment log can be reduced such that the device recorded beacon UUIDs and time information sufficient to identify the time span that the device was in proximity to the UUIDs. With this information, the operation center could recreate the environment conditions experience in that part of the monitored location by accessing the sensor information relevant to that part of the monitored location. For example, the operation center could reproduce the information in columns 820 and 830 using the information in columns 810 and 840.

As this example illustrates, the information broadcasted by the beacon can be reduced to index information that can be used to access environment information stored by the operation center. In one scenario, a beacon can broadcast a UUID and an environment log number. In one embodiment, the environment log number can be a reference number that is incremented every X minutes of time. The UUID and environment log number could then operate as an index into a database of environment information that can enable retrieval of all relevant environment condition information (e.g., sensor measurements, alerts, etc.) associated with the beacon having that UUID and covering a time period represented by the environment log number.

As would be appreciated, log numbers can be generated to correspond to individual beacons, individual events, individual sensors, or any set of one or more identifiable values to reduce the amount of information stored in the environment log. The log numbers can therefore represent any index information that can be used as a reference number into a database of environment condition information.

The example environment log 800 of FIG. 8 represents a basic example of the logging of one ambient condition in the environment. In general, the environment log can include information that enables identification of multiple measures of ambient condition (e.g., temperature, humidity, air quality, light, radiation, or other physical condition) in the environment.

In another application, the environment log can be used to enable identification of consumption, production, or other measurable impact on electricity, water, fuel, or other resource. For example, a sensor in the wireless sensor network can be used to record an amount of power used by a device or associated asset located in the monitored location. The amount of power consumed in a time period can be measured by a sensor and forwarded to a beacon for broadcast. As noted, the measurement information itself or an index into a database that stores measurement information can be provided to the beacon for broadcast. The log of the broadcast information can then be used to recreate the measurable impact. This application can be useful where the particular item producing the measurable impact is only temporarily located in the monitored location.

In another application, the environment log can be used to that enable identification of events related to a monitored location, device or associated asset. Consider, for example, an intrusion detection or other access control system that is configured to identify access to an area, device or associated asset. In one example, a sensor in the wireless network can be used to identify the credentials (e.g., IDs, biometrics, or other identifying information) of the accessing party, and/or results of the incidents of access. The information based on the sensor measurements can then be forwarded to a beacon for broadcast. Again, the measurement information itself or an index into a database that stores measurement information can be provided to the beacon for broadcast. The log of the broadcast information can then be used to recreate the events of access. This application can be useful where limited or otherwise controlled access to an area, device or associated asset in a monitored location needs monitoring.

Figure 9:
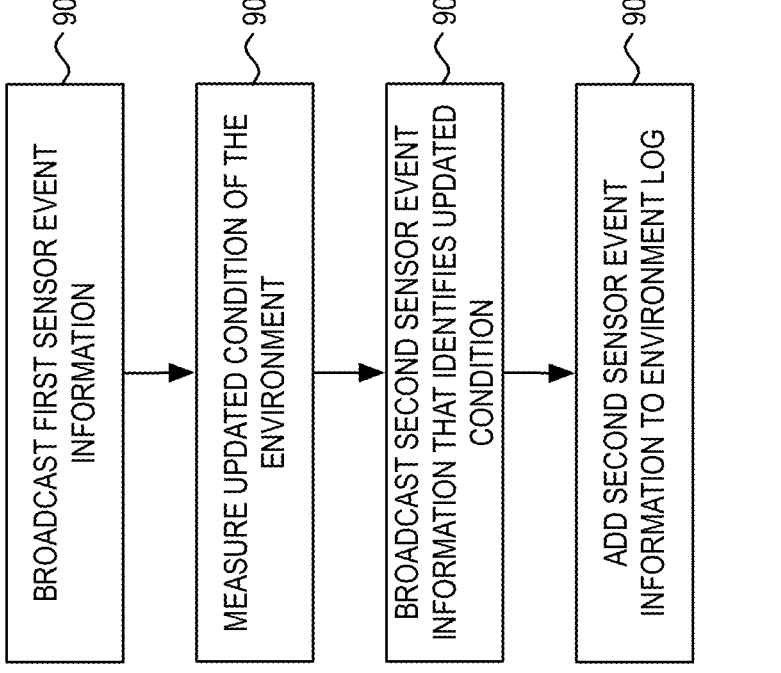
FIG. 9 illustrates a flowchart of an example process.

Having described an example system framework for enabling environment tracking, reference is now made to the FIG. 9, which illustrates a flowchart of an example process. As illustrated, the process can begin at step 902 where a beacon wireless transmitter transmits first sensor event information to at least part of a monitored location. The first sensor event information can be used to identify a first condition of an environment of the monitored location as detected by a sensor in the monitored location area. In one embodiment, the sensor event information can represent the measurement information itself. For example, the sensor event information can represent an ambient condition value (e.g., temperature). In another embodiment, the sensor event information can represent a reference log number that enables access to the measurement information. For example, the sensor event information can represent an index value into a database. In general, the sensor event information can be any information that enables access to measurement information reflective of a condition of the environment.

At step 904, a sensor in the monitored location can measure an updated condition of the environment as compared to the first condition of the environment identified by the first sensor event information. In one embodiment, the measurement of the updated condition of the environment can be triggered using periodic intervals. In another embodiment, the measurement of the updated condition of the environment can be triggered using an alert or other control signal. In general, the measurement of the updated condition of the environment can be triggered whether or not a discernible change in the condition of the environment is expected.

Next, at step 906, the beacon wireless transmitter can transmit second sensor event information to at least part of the monitored location. The second sensor event information can be used to identify a second condition of the environment of the monitored location as indicated by the measurements performed at step 904. The broadcast of second sensor event information following the previous broadcast of first sensor event information enables devices in proximity to the beacon wireless transmitter to record information that enables recreation of a history of the conditions of the environment of the monitored location in which the devices reside. At step 908, the second sensor event information can therefore be added to an environment log maintained by a device. As the environment log is incrementally updated with broadcasts of new sensor event information, the environment log enables identification of a running account of the conditions of the environment from the perspective of the device.

In one application, the environment log can be used to record an experience of the device in the conditions of the environment. In another application, the environment log can be used to verify an account of the conditions of the environment. In yet another application, the environment log can be used to provide assurance of an experience of the device in the environment.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A tracking device, comprising:

a transceiver configured to receive one or more sensor event information values broadcast by a beacon wireless transmitter, the one or more sensor event information values determined by an operation center remote from a building in which the tracking device is located based on a processing of sensor data generated by one or more sensor devices separate from the tracking device; and a memory configured to store the one or more sensor event information values.

2. The tracking device of claim 1, wherein the set of one or more sensor event information values includes a temperature reading by one or more sensors in the one or more sensor devices.

3. The tracking device of claim 1, wherein the set of one or more sensor event information values includes an alert indication.

4. The tracking device of claim 1, wherein the set of one or more sensor event information values includes an environmental impact indication.

5. The tracking device of claim 1, wherein the set of one or more sensor event information values includes an event indication.

6. The tracking device of claim 1, wherein the set of one or more sensor event information values includes a time data value.

7. The tracking device of claim 1, wherein the set of one or more sensor event information values includes a log reference number that enables access to additional data stored at the operation center.

8. The tracking device of claim 1, wherein the set of one or more sensor event information values is updated periodically based on additional measurements by the one or more sensor devices.

9. The tracking device of claim 8, wherein a frequency of the periodic updates of the set of one or more sensor event information values is adjustable based on control information generated by the operation center.

10. The tracking device of claim 1, wherein the tracking device is a radio frequency identification (RFID) device.

11. A method, comprising:

receiving, by a transceiver in a tracking device, one or more sensor event information values generated by an operation center remote from a building in which the tracking device is located, the one or more sensor event information values determined based on processing of sensor data generated by one or more sensor devices separate from the tracking device; and storing, in a memory of the tracking device, the one or more sensor event information values.

12. The method of claim 11, wherein the set of one or more sensor event information values includes a temperature reading by one or more sensors in the one or more sensor devices.

13. The method of claim 11, wherein the set of one or more sensor event information values includes an alert indication.

14. The method of claim 11, wherein the set of one or more sensor event information values includes an environmental impact indication.

15. The method of claim 11, wherein the set of one or more sensor event information values includes an event indication.

16. The method of claim 11, wherein the set of one or more sensor event information values includes a time data value.

17. The method of claim 11, wherein the set of one or more sensor event information values includes a log reference number that enables access to additional data stored at the operation center.

18. The method of claim 11, wherein the set of one or more sensor event information values is updated periodically based on additional measurements by the one or more sensor devices.

19. The method of claim 18, wherein a frequency of the periodic updates of the set of one or more sensor event information values is adjustable based on control information generated by the operation center.

20. The method of claim 11, wherein the tracking device is a radio frequency identification (RFID) device.

* * * * *